United States Patent
Kamble et al.

(10) Patent No.: US 9,948,524 B2
(45) Date of Patent: *Apr. 17, 2018

(54) NETWORK ELEMENT DIAGNOSTIC EVALUATION

(71) Applicant: INTERNATIONAL BUSINESS MACHINES CORPORATION, Armonk, NY (US)

(72) Inventors: Keshav G. Kamble, Santa Clara, CA (US); Vijoy A. Pandey, San Jose, CA (US); Nandakumar Peethambaram, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,177

(22) Filed: Nov. 18, 2016

(65) Prior Publication Data

US 2017/0070401 A1 Mar. 9, 2017

Related U.S. Application Data

(63) Continuation of application No. 13/748,572, filed on Jan. 23, 2013, now Pat. No. 9,571,350.

(51) Int. Cl.
*G06F 15/16* (2006.01)
*H04L 12/24* (2006.01)
(Continued)

(52) U.S. Cl.
CPC .......... *H04L 41/5009* (2013.01); *H04L 41/18* (2013.01); *H04L 43/18* (2013.01);
(Continued)

(58) Field of Classification Search
CPC ...................................................... H04L 43/04
See application file for complete search history.

(56) References Cited

U.S. PATENT DOCUMENTS

| 6,985,697 B2 | 1/2006 | Smith |
|---|---|---|
| 7,895,011 B2 | 2/2011 | Youssefi |
| (Continued) | | |

FOREIGN PATENT DOCUMENTS

| JP | 2004021362 | 1/2004 |
|---|---|---|

OTHER PUBLICATIONS

Berberian, Paul, "Cloud Technology Condition-Based Monitoring", LCE Resource Library 2012 http://reliabilityweb.com/index.php/print/cloud-technology_condition_based_monitoring, accessed Jul. 14, 2012.

(Continued)

*Primary Examiner* — Anthony Mejia
*Assistant Examiner* — Sm Z Islam
(74) *Attorney, Agent, or Firm* — Shimokaji IP

(57) ABSTRACT

A process of diagnosing and debugging a network element remotely may employ sending of performance data to a third party evaluator for processing of the data. A mobile device may interface with the network element and request evaluation of the performance by the third party evaluator. Large memory loads may be sent to the third party evaluator where intensive processing may be performed. The results of the processing by the third party evaluator may be sent to the mobile device for viewing by a user.

17 Claims, 5 Drawing Sheets

(51) Int. Cl.
*H04L 12/26* (2006.01)
*H04L 12/851* (2013.01)
*H04L 12/927* (2013.01)
H04L 29/08 (2006.01)
H04W 24/04 (2009.01)

(52) U.S. Cl.
CPC ........ *H04L 47/2425* (2013.01); *H04L 47/805* (2013.01); *H04L 41/0253* (2013.01); *H04L 67/10* (2013.01); *H04W 24/04* (2013.01)

(56) References Cited

U.S. PATENT DOCUMENTS

| | | | |
|---|---|---|---|
| 8,094,020 B2 | 1/2012 | Groth | |
| 8,489,938 B2* | 7/2013 | Lee | G06F 11/366 |
| | | | 714/45 |
| 2002/0084994 A1 | 7/2002 | Hansen | |
| 2002/0095487 A1 | 7/2002 | Day | |
| 2003/0145142 A1 | 7/2003 | Masuyama | |
| 2005/0188260 A1 | 8/2005 | First | |
| 2009/0063651 A1* | 3/2009 | Brahmavar | G06F 11/0709 |
| | | | 709/212 |
| 2010/0153787 A1* | 6/2010 | Beattie, Jr. | H04L 41/0681 |
| | | | 714/43 |
| 2010/0162257 A1* | 6/2010 | Hiltunen | G06F 9/50 |
| | | | 718/104 |
| 2011/0099403 A1 | 4/2011 | Miyata | |
| 2011/0225458 A1 | 9/2011 | Zuo | |
| 2012/0089724 A1 | 4/2012 | Liang | |
| 2012/0102103 A1 | 4/2012 | Jacobson | |
| 2012/0150898 A1 | 6/2012 | Larese | |
| 2012/0173837 A1 | 7/2012 | Schneider | |

OTHER PUBLICATIONS

Conner, Margery, "Platform Manages Cloud Computing", EDN, v. 55, n. 12 (Jun. 24, 2010), p. 14 http://www.edn.com/electronics-products/other/4363474/Platform-manages-computing-cloud. accessed Jul. 14, 2012.

Ben-Yehuda, Muli, "NAP: A Building Block for Remediating Performance Bottlenecks via Black Box Network Analysis", Proceedings of the 6th International Conference on Autonomic Computing, ICAC'09, Jun. 15-19, 2009, pp. 197-187. Published by Association of Computing Machinery (ACM).

Unknown, "How do I send objdump result to a file?", Mar. 22, 2011 http://stackoverflow.com/questions/5385227 /how-do-i-send-objdump-result-to-a-file, accessed Jul. 14, 2012.

Unknown, "Fix two objdump tests for remote-host testing", Mar. 11, 2009 http://sourceware.org/ml/binutils/2009-03/m5900211.html, accessed Jul. 14, 2012.

* cited by examiner

NETWORK ELEMENT DIAGNOSTIC EVALUATION

CROSS REFERENCE TO RELATED APPLICATIONS

The present invention is a continuation of application Ser. No. 13/748,572 filed Jan. 23, 2013, and claims priority to that application.

BACKGROUND

The present invention relates to network troubleshooting, and more specifically, to a network element diagnostic evaluation.

Network administrators or technicians typically need to diagnose underperformance in a network. Conventional approaches require an administrator to perform diagnosis locally at the network element. Debugging and diagnosing various network and switching gears (referred to hereinafter, as "network elements") is typically performed by collecting large memory dumps and/or large amounts of packet captures and analyzing the data for performance or errors. Analysis of memory dumps and packet captures may require huge computing power and large amounts of memory, typically performed by a local machine. In order to perform diagnosis and debugging, the local machine is connected to the network element so that software resident on the local machine can obtain the memory dump or packet capture and perform the intensive computing during analysis. Thus, under conventional approaches, a local machine with sufficient computing power should either be permanently connected to the network element or should be shuttled around to each network element for connection and diagnosis. As may be appreciated, this can cause unnecessary labor and expense.

SUMMARY

According to one embodiment of the present invention, a computer program product for operating conditions of a network element, comprises a computer readable storage medium having computer readable program code embodied therewith. The computer readable program code is configured to: identify a network element; interface remotely with the network element; direct the network element to send performance data of the network element over a network to a third party evaluator; and receive, from the third party evaluator results related to a diagnosis of the performance data.

According to another embodiment of the present invention, a system comprises a mobile device configured to remotely transmit instructions to a network element. The system includes an application resident on the mobile device providing software as a service. The application includes instructions configured to: interface remotely with the network element; direct the network element to send performance data of the network element over a network to a third party evaluator; and receive on the mobile device, from the third party evaluator results related to a diagnosis of the performance data.

According to yet another embodiment of the present invention, a process of diagnosing performance in a network element comprises identifying a network element. The process may include interfacing remotely with the network element. The process may direct the network element to send performance data of the network element over a network to a third party evaluator. The process may include receiving, from the third party evaluator results related to a diagnosis of the performance data.

DETAILED DESCRIPTION

Figure 1:
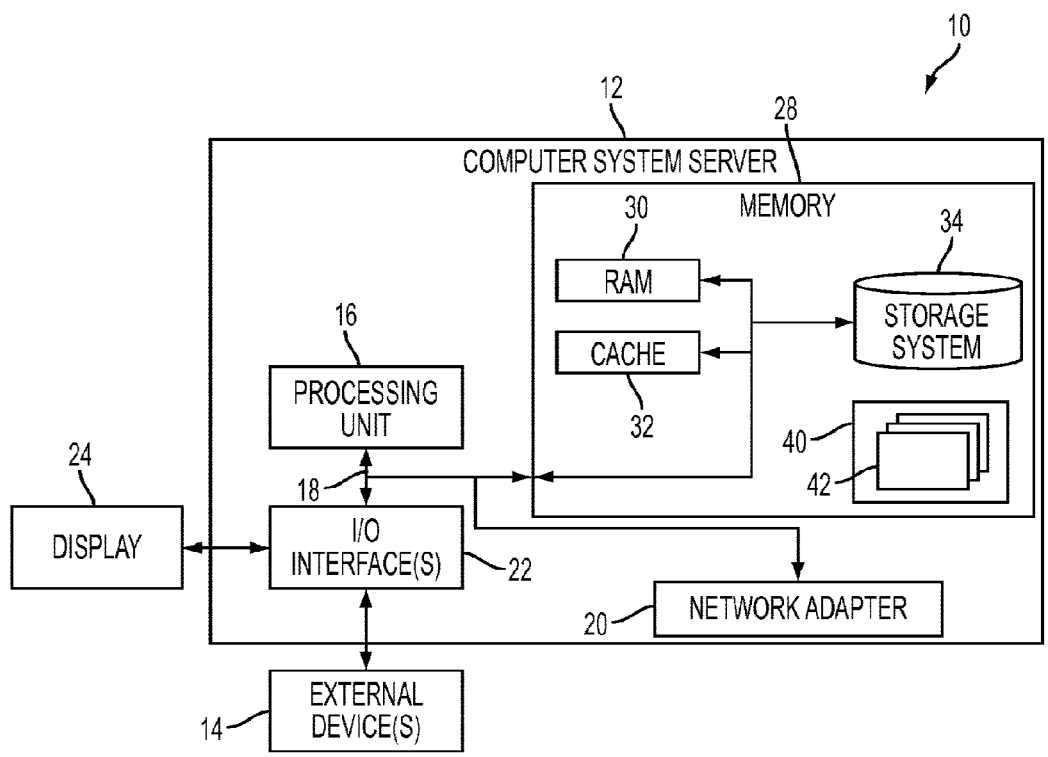
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics May Include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
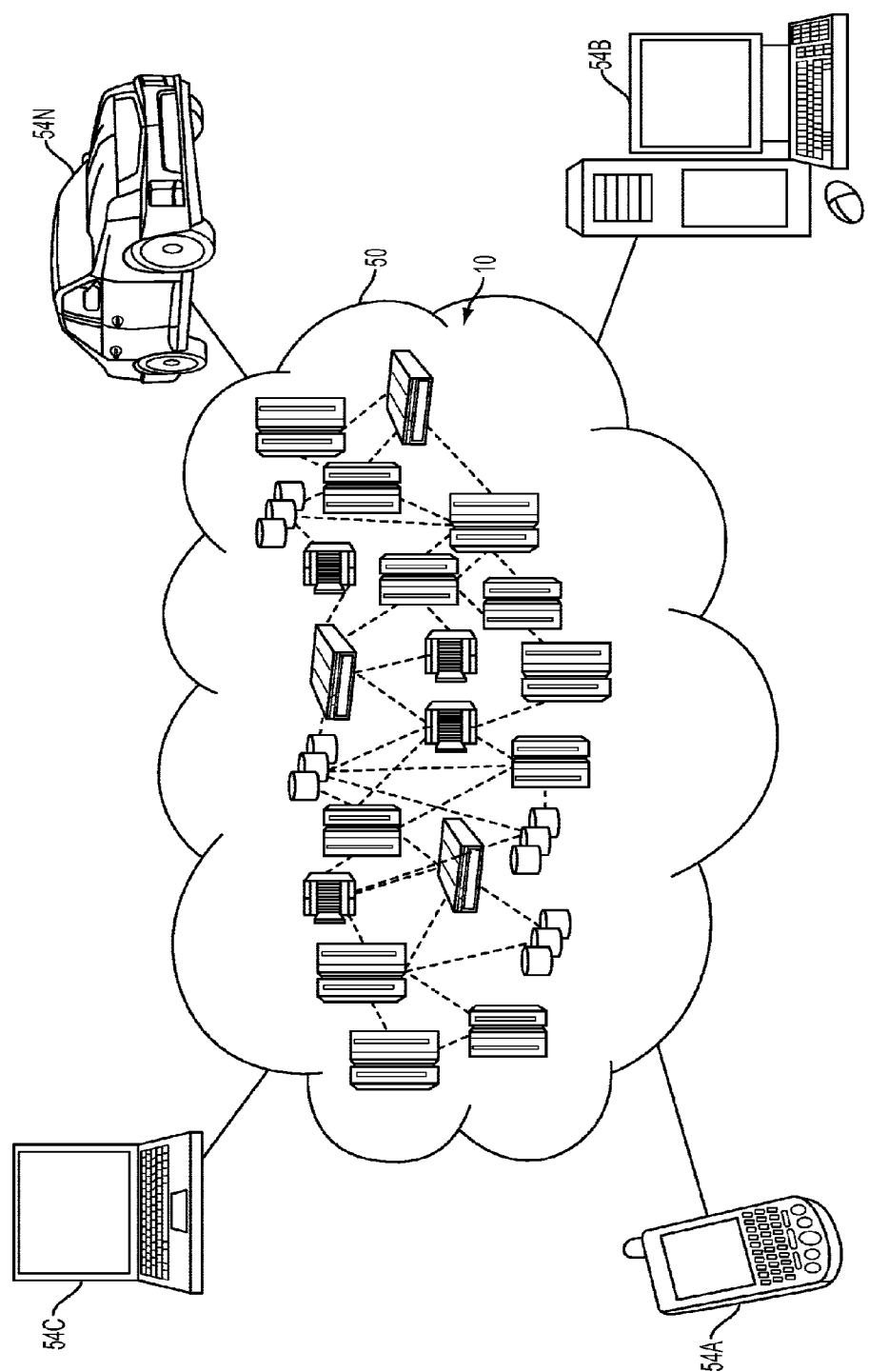
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or a automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
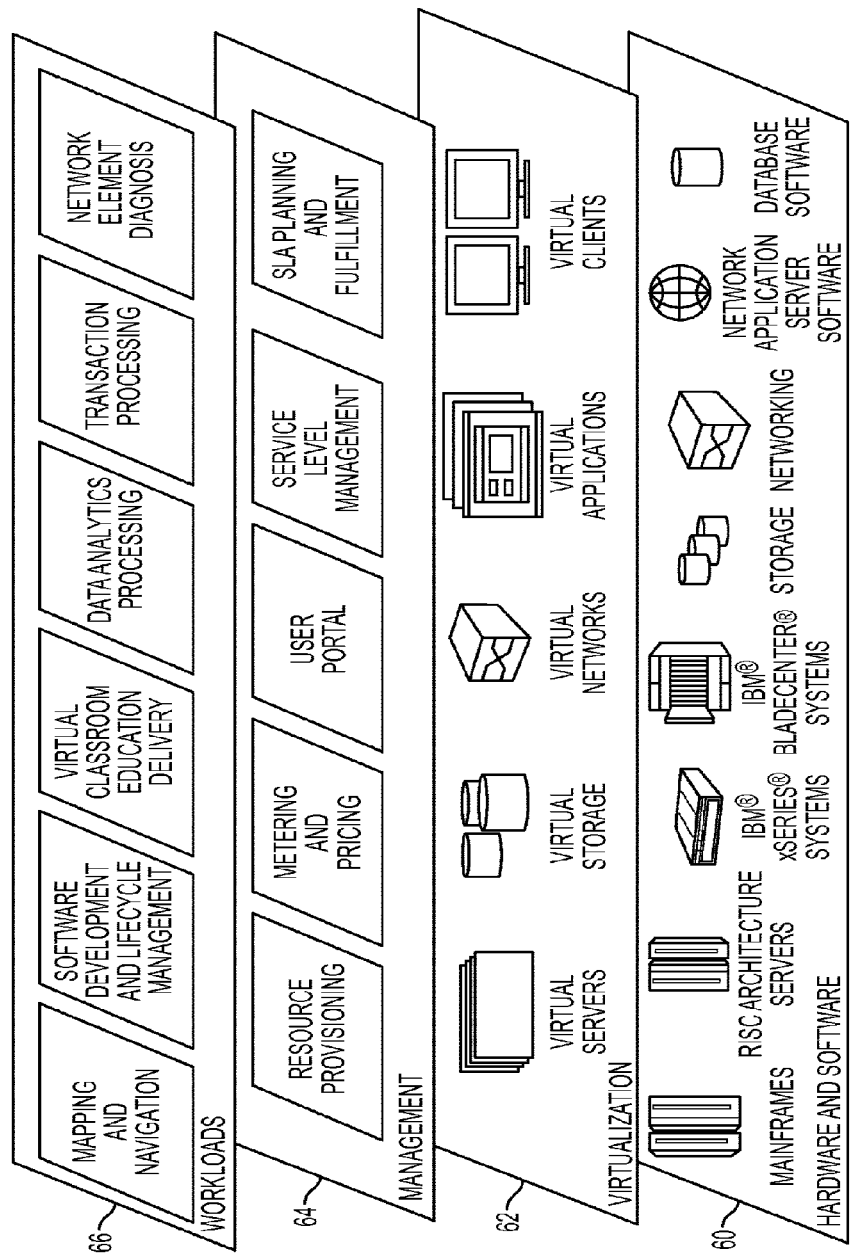
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 may provide functionality for which the cloud computing environment may be utilized. Examples of workloads and functions which may be provided from this layer include: mapping and navigation; software development and lifecycle management; virtual classroom education delivery; data analytics processing; transaction processing; and network element evaluation and diagnosis.

Figure 4:
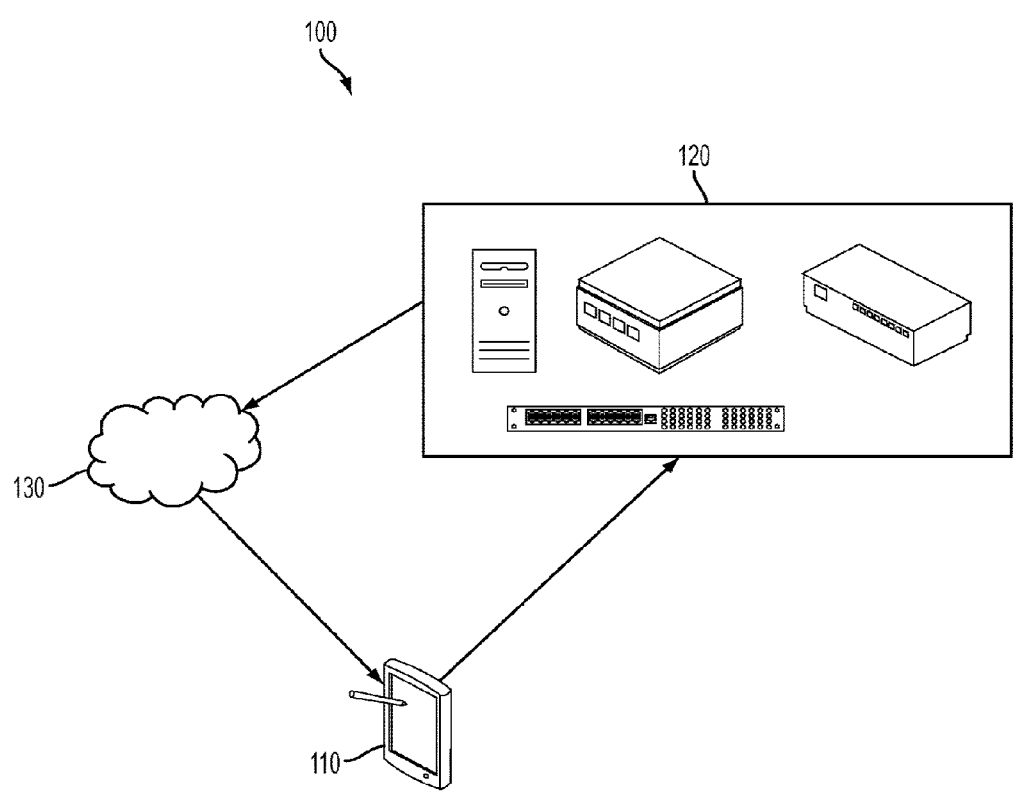
FIG. 4 is a block diagram of a system according to still another embodiment of the present invention.

Referring now to FIG. 4, a system 100 is shown according to an exemplary embodiment of the present invention. The system 100 may include a mobile device 110, one or more network elements 120, and a network 130. The mobile device 110 may be, for example, a mobile telephone, a portable laptop or notebook computer, or a tablet type device. The mobile device 110 may include an application configured to interface with and receive operating conditions related to the network element(s) 120. The network element(s) 120 may be, for example, a network switch, a server, a router, a repeater, or a bridge. The network element(s) 120 may be part of a larger network environment. The network 130 may include connection to a cloud based environment. Within the network 130, one or more computers (not shown) may perform compute and analysis functions of data provided by the network element(s) 120. The computers may be considered a third party evaluator of the performance of the network element(s) 120.

Figure 5:
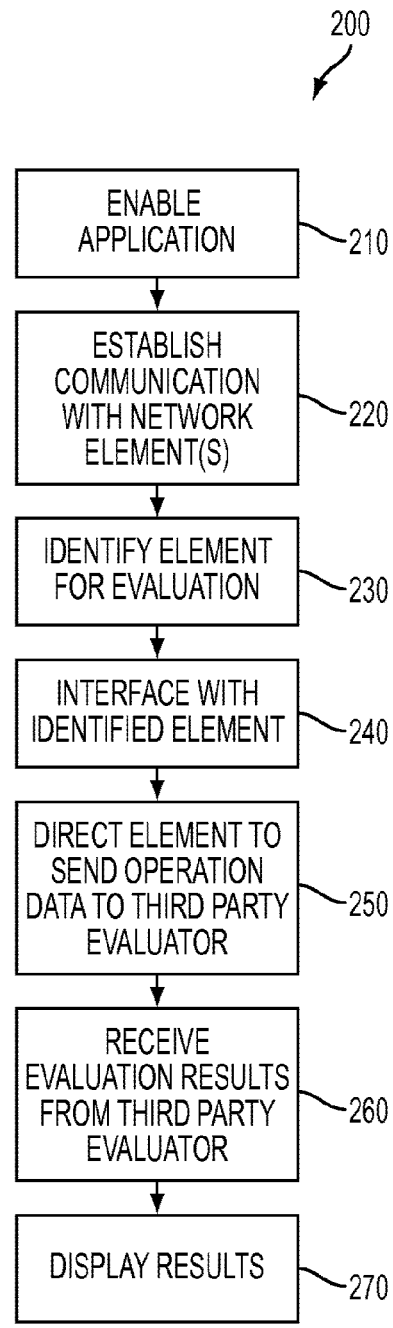
FIG. 5 is a flowchart of a process of providing a diagnosis of a network element in the system of FIG. 4 according to yet another embodiment of the present invention.

Referring now to FIG. 5, a process 200 of diagnosing performance in a network element 120 is shown. In exemplary embodiments, the process 200 may be performed by a computer program product, for example, an application resident on the mobile device 110. In embodiments of the invention, the process 200 may be provided as software as a service that may include a component resident on the mobile device 110 and one or more components resident within a cloud based environment of the network 130.

A user, for example a network administrator or technician may enable (210) the application on the mobile device 110. The mobile device 110 may establish (220) a remote communication link with the network element(s) 120. In embodiments of the invention the link may be wireless, employing for example, Bluetooth® technology to connect the mobile device 110 to the network element 120. The application may identify (230) which network element 120 to diagnose or debug. Identification may be automated or may be manually selected. The network element 120 may be identified based on known underperformance. In some cases, the network element 120 may be identified due to routine maintenance checks. The application may initiate (240) an interface between the mobile device 110 and the network element 120. Instead of receiving large memory loads related to the network element's 120 performance at the mobile device, the application may direct (250) the network element 120 to send performance data to the network 130. Performance data may be supplied in the form of, for example, a core memory dump, a memory manager dump, or packet captured data of packet traffic passing through the network element 120. One or more third party evaluators in the network 130 may receive the performance data. The third party evaluators may process and analyze the data providing results related to diagnosing underperformance within the network element 120. It may be appreciated that intensive computing and processing tasks associated with memory dumps may be accomplished by the third party evaluators that may normally overload or tie up system resources on a mobile device. In addition, large memory loads sent by the network element 120 may be distributed to multiple computing machines within cloud based embodiments resulting in efficient processing and analysis. The mobile device 110 may receive (260) the evaluation results from the third party evaluator(s). The application may display (270) the results on the mobile device 110 for the user to view and take appropriate action.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for evaluating operating conditions of a network element, the computer program product comprising a non-transitory computer readable storage medium having computer readable program code embodied therewith, the computer readable program code being configured to:

automatically, using a virtual operating system within a cloud computing environment, identify a network element, that provides resources to a client, based on underperformance of the network element, wherein the performance of the network element is representative of planning, fulfillment and pre-arrangement for, and procurement of, cloud computing resources for which a future requirement for resources is anticipated in accordance with a service level agreement, and wherein the service level agreement defines the resources to be provided to the client, wherein the cloud computing environment includes a virtual abstraction layer for hardware and software, a virtual abstraction layer for virtualization entities, a virtual abstraction layer for management of procuring computing products, and a virtual abstraction layer for workload management;

direct the identified network element to send performance data of the network element over a network to a third party evaluator, wherein the performance data is representative of a performance of the identified network element; and receive, from the third party evaluator, results related to diagnosis of the performance data.

2. The computer program product of claim 1, including interfacing remotely with the identified network element, wherein the interfacing is performed wirelessly.

3. The computer program product of claim 1, wherein the sending of performance data is performed through a cloud based network.

4. The computer program product of claim 1, wherein the computer program product is resident as an application on a mobile device.

5. The computer program product of claim 1, wherein the performance data include a core memory dump sent to the third party evaluator through a cloud based network.

6. The computer program product of claim 1, wherein the performance data include a packet capture of packet data passing through the network element to the third party evaluator through a cloud based network.

7. A system, comprising:
a mobile device configured to transmit instructions to a network element; and
an application resident on the mobile device, wherein the application includes instructions configured to:
interface with the network element within a cloud computing environment, wherein the cloud computing environment includes a virtual abstraction layer for hardware and software, a virtual abstraction layer for virtualization entities, a virtual abstraction layer for management of procuring computing products, and a virtual abstraction layer for workload management;
direct the network element, using the mobile device, to send performance data of the network element over a network to a computing machine associated with an evaluator, wherein the evaluator accomplishes intensive computing and processing tasks associated with memory dumps from the mobile device that would otherwise overload system resources on the mobile device;
receive on the mobile device, from the third party evaluator, results related to diagnosis of the performance data.

8. The system of claim 7, wherein the mobile device is configured to interface wirelessly with the network element.

9. The system of claim 7, wherein the application is configured to direct the network element to send performance data to the third party evaluator through a cloud based network.

10. The system of claim 7, wherein the application is configured to request that the performance data sent to the third party evaluator include a core memory dump sent through a cloud based network.

11. The mobile device of claim 7, wherein the application is configured to request that the performance data sent to the third party evaluator include a packet capture of packet data passing through the network element sent through a cloud based network.

12. A process of diagnosing performance in a network element, comprising:
identifying a network element, using a virtual operating system within a cloud computing environment,
wherein the process operates within a cloud computing environment, wherein the cloud computing environment includes a virtual abstraction layer for hardware and software, a virtual abstraction layer for virtualization entities, a virtual abstraction layer for management of procuring computing products, and a virtual abstraction layer for workload management;
interfacing with the identified network element;
directing the identified network element to send performance data over a network to a third party evaluator, wherein the performance data is representative of the performance of the identified network element; and
receiving, from the evaluator, results related to diagnosis of the performance data, wherein the diagnosis of the performance data is representative of routine maintenance of the identified network element and at least one reason that the identified network element is underperforming.

13. The process of claim 12, wherein the interfacing is performed wirelessly.

14. The process of claim 12, wherein the sending of performance data is performed through a cloud based network.

15. The process of claim 12, wherein the interfacing is performed on a mobile device.

16. The process of claim 12, wherein the performance data include a core memory dump sent to the third party evaluator through a cloud based network.

17. The process of claim 12, wherein the performance data include a packet capture of packet data passing through the identified network element to the third party evaluator through a cloud based network.

* * * * *